United States Patent Office 3,354,127
Patented Nov. 21, 1967

3,354,127
AROMATIC COPOLYAMIDES
Harold Wayne Hill, Jr., Bartlesville, Okla., and Stephanie
Louis Kwolek and Wilfred Sweeny, Wilmington, Del.,
assignors to E. I. du Pont de Nemours and Company,
Wilmington, Del., a corporation of Delaware
No Drawing. Continuation of application Ser. No.
109,832, May 15, 1961. This application Apr. 18,
1966, Ser. No. 543,078
6 Claims. (Cl. 260—78)

This application is a continuation of application Ser. No. 109,832, filed May 15, 1961 (now abandoned), which is a continuation-in-part of application Ser. No. 774,156, filed Nov. 17, 1958 (now United States Patent No. 3,094,511, dated June 18, 1963), which in turn is a continuation-in-part of application Ser. No. 642,928, filed Feb. 28, 1957, and now abandoned.

This invention relates to a novel polymer and articles prepared therefrom. More specifically, it relates to a high molecular weight aromatic polyamide having unique properties.

It is known that diamines may be reacted with dibasic acids to form polyamides. These polymers have found wide commercial acceptance because they can be formed into strong abrasion-resistant fibers and films. Known polyamides, however, are deficient in several desirable properties. For example, polyamides disclosed in U.S. 2,130,948 have relatively low melting points, and degrade rapidly in the presence of air at temperatures as low as 200° C. More important, these polyamides lose a substantial portion of their strength at temperatures much lower than their melting points. There has been a need for a high molecular weight polyamide which is strong and stable at high temperatures, suitable for forming into filaments and films having good clarity, and which would retain these properties for extended periods of time in an oxidizing atmosphere.

In accordance with the present invention, there is provided a high molecular weight aromatic polyamide having the repeating structural unit

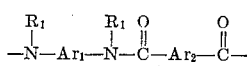

where $R_1$ is selected from the group consisting of hydrogen and lower alkyl, and $Ar_1$ and $Ar_2$ are divalent aromatic radicals the intralinear polymer bonds of which are attached directly to non-adjacent carbon atoms in the respective aromatic rings, said bonds being positioned in the meta position in 50–80% of the $Ar_2$ radicals and in the para position in the remaining $Ar_2$ radicals, said polyamide having an inherent viscosity of at least 0.6 at 30° C. in concentrated sulfuric acid at a polymer concentration of 0.5% by weight.

The high molecular weight polymer of this invention is termed "an aromatic polyamide." This term refers to a polymer wherein aromatic radicals are linked by a carbonamide group, i.e., the

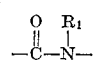

radical ($R_1$ being the same as above indicated), the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic ring. The term "aromatic ring" means a carbocyclic ring possessing resonance. Exemplary aromatic radicals having the following structural formulas

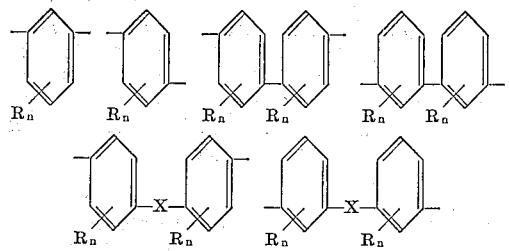

in which R is preferably a lower alkyl, lower alkoxy, or halogen group, $n$ is a number from 0–4, inclusive, and X is preferably one of the groups of

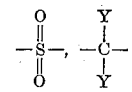

and —O—, in which Y is a hydrogen or a lower alkyl group. X may also be a lower alkylene or lower alkylene dioxy group although these are somewhat less desirable. R may also be a nitro, lower carbalkoxy, or other non-polyamide-forming group. All of these aromatic radicals are divalent and meta or para oriented, i.e., the unsatisfied bonds of the radicals (the "intralinear bonds" when the radical is viewed in the repeating unit of the structural formula of the polymer) are meta or para oriented with respect to each other. One or more of the aromatic radicals may contain substituent groups as indicated and any aromatic ring may contain two or more of the same or different substituent groups. The total number of substituent groups or carbon atoms attached to any aromatic ring is desirably less than about four and preferably all the aromatic radicals are phenylene, these polymers providing superior wire coatings. The term "intralinear bond" refers to any bond in the polyamide which, if broken, would decrease the length of the polymer chain.

The high molecular weight polymers of this invention are prepared by reacting at low temperature (below 100° C.) a mixture of at least two aromatic dicarboxylic acid halides, preferably the chlorides, with an aromatic diamine. The acid chloride and amino groups of these aromatic compounds must be meta or para to each other and 50–80% by weight of the aromatic dicarboxylic acid halide mixture must be a compound with the acid halide groups positioned meta to each other.

Diacid chlorides of dibasic aromatic acids useful as reactants in preparing polymers of the present invention are compounds of the formula

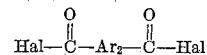

wherein $Ar_2$ is a divalent aromatic radical, i.e., it contains resonant unsaturation, and Hal is a halogen atom from the class consisting of chlorine, bromine, and fluorine. The aromatic radical may have a single, multiple, or fused ring structure. One or more hydrogens of the aromatic nucleus may be replaced by non-polyamide-forming groups such as lower alkyl, lower alkoxy, halogen, nitro, sulfonyl, lower carbalkoxy, and the like. The terms "lower alkyl" and "lower alkoxy" and "lower carbalkoxy" refer to groups containing less than five carbon atoms.

Diacid chlorides which may be utilized to prepare the polyamides of this invention include isophthaloyl chloride and lower alkyl isophthaloyl chlorides, such as methyl-, ethyl-, propyl-, etc., isophthaloyl chlorides. There may be more than one alkyl group attached to the aromatic ring as in the case of dimethyl, trimethyl, tetramethyl, diethyl, triethyl, and tetraethyl isophthaloyl chlorides. The total number of carbon atoms in the substituents attached to the aromatic ring should not exceed six. It is not necessary that all of the alkyl substituent groups be the same because compounds such as 2-methyl-4-ethyl isophthaloyl chloride and 2-methyl-4-ethyl-5-propyl isophthaloyl chloride may be utilized, the total number of carbon atoms in all the substituent groups (non-polyamide-forming groups) attached to the aromatic ring in the latter two compounds being 3 and 6, respectively. In place of an alkyl group, the aromatic ring in isophthaloyl chloride may be substituted with one or more lower alkoxy groups such as, for example, methoxy-, ethoxy-, propoxy-, butoxy-, etc., isophthaloyl chlorides. As with alkyl-substituted isophthaloyl chlorides it is desirable that the total number of carbon atoms in the alkoxy groups attached to the aromatic ring be less than six, but it is not necessary that all of the alkoxy groups be the same. Representative of such compounds are dimethoxy-, trimethoxy-, tetramethoxy-, and diethoxy-isophthaloyl chlorides, and 2-methoxy-4-ethoxy isophthaloyl chloride. Halogen-substituted isophthaloyl chlorides as exemplified by chloro-, bromo-, and fluoroisophthaloyl chlorides may be used. More than one halogen may be attached to the aromatic ring and dihalo isophthaloyl chlorides, such as dichloro-, dibromo- difluoro-, or chlorobromo-, chlorofluoro-isophthaloyl chlorides are useful as are similar trihalo and tetrahalo isophthaloyl chlorides. The halogens in these compounds may be the same or different as in the case of the dihalo compounds.

Other isophthaloyl chlorides which may be used include nitro and lower carbalkoxy isophthaloyl chlorides. One or more of the latter groups may be attached to the aromatic nucleus along with one or more alkyl, alkoxy, or halogen groups so long as the total number of carbon atoms in the substituents attached to the aromatic ring does not exceed six. Thus, it will be apparent that the aromatic radical of the isophthaloyl chloride may contain one or more or any combination of lower alkyl, lower alkoxy, halogen, nitro, phenyl, lower carbalkoxy, or other non-polyamide-forming groups.

In addition to isophthaloyl chlorides and substituted isophthaloyl chlorides specified above, corresponding unsubstituted and substituted terephthaloyl chloride may be used. The substituted terephthaloyl chlorides correspond to the substituted isophthaloyl chlorides described above and include lower alkyl, lower alkoxy, halogen, nitro, phenyl, and carbalkoxy substituted terephthaloyl chlorides. There may be one or more or a combination of these substituents attached to the aromatic ring so long as the total number of carbon atoms in all the substituents does not exceed six. Representative terephthaloyl chloride compounds which may be mentioned include, in addition to the terephthaloyl chloride itself, methyl-, ethyl-, propyl-, butyl-, etc., terephthaloyl chlorides, methoxy-, ethoxy-, propoxy-, butoxy-, etc., terephthaloyl chlorides, chloro-, bromo-, dichloro-, chlorobromo-, etc., terephthaloyl chlorides, and nitro and lower carbalkoxy-terephthaloyl chlorides.

In addition to the single ring diacid chlorides specified above, multiple ring diacid chlorides in which the acid chloride groups are oriented meta or para with respect to each other are also useful in this invention. Exemplary of such para oriented compounds are 4,4'-oxydibenzoyl chloride, 4,4'-sulfonyldibenzoyl chloride, and 4,4'-dibenzoyl chloride. The corresponding meta oriented compounds are 3,3'-oxydibenzoyl chloride, 3,3'-sulfonyldibenzoyl chloride, and 3,3'-dibenzoyl chloride, the corresponding bromides and fluorides, and similar compounds in which one or both of the aromatic rings contains one or more of a combination of lower alkyl, lower alkoxy, halogen, nitro, sulfonyl, lower carbalkoxy groups. With multiple ring diacid chlorides, it is not so critical that 80:20 to 50:50 ratio of meta:para diacid chloride be maintained and in some instances good polymer solvency, flexibility and aging properties are obtained outside this range.

The diamines useful as reactants in forming the polymer of this invention are compounds of the formula $$H_2N-Ar_1-NH_2 \text{ and } R_1-HN-Ar_1-NH-R_1$$

where $R_1$ is hydrogen or lower alkyl and $Ar_1$ is a divalent aromatic radical as defined above and the —$NH_2$ and —NHR groups are oriented meta or para with respect to each other. The diamines may contain single or multiple rings as well as fused rings. One or more hydrogens of the aromatic nucleus may be replaced by non-polyamide-forming groups such as lower alkyl, lower alkoxy, halogen, nitro, sulfonyl, lower carbalkoxy as mentioned above. The total number of carbon atoms in the substituent groups attached to any aromatic ring should preferably not exceed about six if good aging properties are desired for the polymer. The most useful polymers are those whose elongation increases with increasing temperature and these will normally be those prepared from aromatic diamines in which the aromatic group has at least as long a linear structure (provides at least as many atoms in the intralinear polymer chain) as m-phenylene diamine.

Exemplary diamines which may be utilized in this invention include meta-phenylene diamine and lower alkyl substituted meta-phenylene diamine such as methyl-, ethyl-, propyl-, and butyl-, meta-phenylene diamine; N,N'-dimethylmetaphenylene diamine, N,N'-diethylmetaphenylene diamine, etc. There may be more than one alkyl group attached to the aromatic ring as in the case of dimethyl, trimethyl, tetramethyl, diethyl, and triethyl meta-phenylene diamine. The alkyl substituent groups need not be the same because compounds such as 2-methyl-4-ethyl meta-phenylene diamine and 2-methyl-4-ethyl-5-propyl meta-phenylene diamine may be utilized. In place of an alkyl group, the armatic ring may be substituted with one or more lower alkoxy groups such as, for example, methoxy-, ethoxy-, propoxy-, butoxy-, meta-phenylene diamine. Other representative aromatic diamines which may be utilized include dimethoxy, trimethoxy, tetramethoxy, diethoxy meta-phenylene diamine, and 2-methoxy-4-ethoxy meta-phenylene diamine. Halogen-substituted meta-phenylene diamine as exemplified by chloro, bromo, and fluoro meta-phenylene diamine may be utilized. More than one halogen may be attached to the aromatic ring. The halogens in these compounds may be the same or different as in the case of the dihalo compound. Other meta-phenylene diamines which may be used include nitro and lower carbalkoxy meta-phenylene diamines. One or more of the latter groups may be attached to the aromatic nucleus along with one or more alkyl, alkoxy, or halogen groups.

In addition to meta-phenylene diamine and substituted meta-phenylene diamines specified above, the corresponding unsubstituted and substituted para-phenylene diamine compounds may also be used. There may be one or more or a combination of substituents attached to the aromatic ring as in the case of the substituted metaphenylene diamine.

In addition to the single ring aromatic diamines specified above, multiple or fused ring aromatic diamines in which the amino groups are oriented meta or para with respect to each other are also useful in this invention. Examplary of such compounds are 4,4'-oxydiphenyldiamine, 4,4'-sulfonyldiphenyldiamine, 4,4'-diphenyldiamine, 3,3'-oxydiphenyldiamine, 3,3'-sulfonyldiphenyldiamine, and 3,3'-diphenyldiamine, and the corresponding compounds in which one or both of the aromatic rings contains one or more or a combination of lower alkyl, lower alkoxy, halogen, nitro, sulfonyl, lower carbalkoxy groups and the total number of carbon atoms in the substituent groups attached to an aromatic ring preferably does not exceed six.

In preparing the polymers of this invention, two or more aromatic diamines can be employed in place of a single diamine. In addition, up to about 10% polymer-forming ingredients which may or may not contain an aromatic nucleus can be included without seriously detracting from the extraordinary physical and chemical properties of the polymers of this invention. Preferably, however, the diamine utilized will be wholly aromatic, thus resulting in a polymer characterized entirely by structural units with all of the nuclei containing aromatic radicals.

Polymers of this invention are characterized by an exceptionally high melting point. Whereas known polyamides melt at temperatures below about 270° C., generally the polyamides of this invention have melting points in excess of 300° C. and in many instances above 350° C. Moreover, filaments of polyamides of this invention retain their filament form at temperatures of about 300° C. Polymers of this invention are also distinguished from known polyamides in having good color, excellent resistance to corrosive atmospheres, substantially no flammability, and outstanding resistance to degradation by high energy particle and gamma ray radiation. These polymers resist melting upon exposure to 300° C. for extended periods while retaining hitherto unrealized high proportion of room temperature physical properties. Flash exposure for 20 seconds to temperatures as high as 700° C. does not destroy these properties. Because of their solubility, these polymers may be processed into shaped structures such as films, filaments and coating compositions by conventional techniques. These polymers have high tenacity, good work recovery and high flex life at elevated temperatures.

The good solubility of the polymers of this invention in a variety of practical solvents renders them valuable as coating and laminating resins. Salts are not necessary to dissolve these polymers and the deleterious effects of salts, such a calcium chloride, in insulation coatings are avoided. Moreover, the polymers of this invention possess surprising superior flexibility compared to closely related polymers and exhibit excellent elasticity at elevated temperatures. The elongation at break of these polymers increases with increasing temperature making them excellent for wire coatings, particularly for use at high temperatures. Moreover, these polymers, expecially those in which all aromatic radicals are phenylene groups, have outstanding resistance to aging deterioration and excellent heat stability.

In the form of films, polymers of this invention may be used in automotive and aviation interior head lining materials, decorative trim, high temperature heat and electrical insulation, such as for slot liners, use in dry transformers, capacitors, cable wrappings, etc., packaging of items to be exposed to high temperature or high energy radiation while within the package, corrosion resistant pipe, hot water pipe, duct work, hot air ventilation, aircraft body skins, aircraft radomes, embossing roll covers, containers and container linings, printed circuits, tape for hot pipe overwrapping, laminated structures where the films are bonded to metal sheets or foils, mold liners or self-sustaining containers for casting low-melting (below 300° C.) fusible materials, including metals, and a variety of other similar and related uses. Valuable flexible materials similar in function to putty with outstanding high temperature stability can be made by combining fibers prepared from polymers of the present invention with flexible high-temperature polymers such as plasticized chlorotrifluoroethylene polymers.

Films formed from polymers of this invention may be stretched or otherwise oriented according to conventional procedures. Films may be oriented biaxially by stretching or rolling in both directions or by rolling in one direction and stretching in the other.

The following examples illustrate the invention. All parts and percentages are by weight unless otherwise indicated. Values of inherent viscosity are determined in sulfuric acid (sp. gr. 1.841 at 60° F.), at 30° C. at a concentration of 0.5 gram polymer per 100 cc. of solution. All polymers of this invention have an inherent viscosity of at least about 0.6 on this basis and a melting point of at least about 300° C. Viscosities expressed in centipoises are measured by a Brookfield Viscosimeter at 25° C. and and all color grades are Gardner-Holdt, 1933, unless otherwise indicated.

*Example 1*

A copolymer of meta-phenylene diamine and a mixture of isophthaloyl (80 mole percent) and terephthaloyl (20 mole percent) chlorides is prepared by simultaneously adding to a Waring Blendor a solution of 43.9 parts of isophthaloyl chloride, 10.98 parts of terephthaloyl chloride dissolved in 1600 parts of methylene chloride and a solution of 48.87 parts of metaphenylene diamine hydrochloride, 109.3 parts of triethylamine in 1600 parts of methylene chloride. An additional 400 parts of methylene chloride is used for rinse purposes and added to the reaction mass. After 10 minutes, polymer having an inherent viscosity of 1.44 and a polymer melt temperature of 370° C. is formed.

36 parts of the polymer so prepared is dissolved in 114 parts of dimethylformamide and is extruded through a five-hole spinneret (orifice diameter of 0.004 inch) into a cross-flow air column, the wall temperature of which is maintained at 200° C. The yarn is collected at 158 feet per minute and is drawn 2.75 times its extruded length. It has a tenacity of 3.5 grams per denier, a break elongation of 34%, and an initial modulus of 55 grams per denier.

The above polymerization is repeated shifting the proportion of acids to provide 70 mole percent of isophthaloyl chloride and 30 mole percent of terephthaloyl chloride. The product has an inherent viscosity of 1.89. A film of 15 mil thickness is cast from a 15% solution of the polymer in dimethylformamide. The washed and dried structure shows excellent physical properties, particularly as indicated below:

| Temperature, ° C. | Tensile Strength (p.s.i.) | Modulus (p.s.i.) | Elongation (percent) |
|---|---|---|---|
| 20 | 14,600 | 640,000 | 4.05 |
| 150 | 9,850 | 290,000 | 11.8 |
| 200 | 8,100 | 400,000 | 12.3 |

*Example 2*

A film of copolymer of meta-phenylene diamine with 70 mole percent of isophthaloyl chloride and 30 mole percent of terephthaloyl chloride is prepared as in Example 1. The film is placed in a two-way stretcher and sprayed from above and below with steam at 20 p.s.i. After 30 seconds, the film is pulled rapidly in both directions to produce a two-way drawn film similar to the film which is oriented by hot-rolling in two directions. The film is drawn 1.85 times its original length in the other direction. After this two-way orientation process, the film is tested and the following physical properties observed. Initial modulus (measured at 74° F.) in the direction of greater draw is 659,000 pounds/sq. in., and in the direction of lower draw is 413,000 pounds/sq. in. Tenacity (measured at 74° F.) in the direction of greater draw is 16,515 pounds/sq. in. at the break, and in the direction of lower draw is 13,697 pounds/sq. in. at the break. Elongation is measured under the same conditions and in the direction of greater draw is 24.7% while in the direction of the lower draw is 26.3%. Coating compositions comprising solutions of the above copolymer in dimethylformamide, when applied to glass fabrics or wire, or fabrics made from fibers of Example 1 aromatic polyamides, produce excellent high temperature stable heat and electrical insulation coatings.

*Example 3*

A solution of MPD–I/T (70/30) is made by dissolving 73 g. of the polymer of Example 1 in 657 g. dimethyl formamide (technical grade) by stirring and warming gently. This solution has a viscosity of about 85 centipoises, a color 6–8 and a solids of 10%. Upon several months standing, this solution increases slightly in viscosity but the polymer does not crystallize from solution. This solution is useful commercially as an insulating varnish, as a wire enamel and as coating for glass fabrics which can subsequently be laminated.

*Example 4*

A solution of poly(meta-phenylene-isophthalamide), referred to as MPD–I, is made by dissolving 65 g. of the polymer in 538 g. dimethyl acetamide and stirring and warming gently. This solution is thinned with dimethyl formamide to about 85 centipoises and a solids content of about 10%. It is not useful as a coating composition because the polymer crystallizes out of solution too quickly (usually from a few minutes to a few hours) at 60° C. and cannot be put back into solution by ordinary methods such as heating and stirring.

*Example 5*

A coated glass fabric suitable for electrical insulation purposes is made from the copolymer solution of Example 3. In a typical coating tower arrangement, woven glass fabric (ECC–11–108) is run through a solution of polymer at the rate of ¼ yard per minute and then through a drying tower at 200° F. for 8–10 minutes. A second coat is applied in the same manner. The product is 4 mils thick and has an electric strength of 1,100 volts/mil. After 3 weeks aging at 205° C., this electric strength has not changed. After 3 weeks aging at 250° C., the electric strength has dropped to 900–1000 volts/mil. This is much superior to conventional fabric coatings used in Class A (105°) type insulation and qualifies easily for Class H (180° C.).

A similar coated glass fabric is made from the MPD–I solution of Example 4 providing this is done rapidly before crystallization of polymer from the solution occurs. The product obtained, after 2 coats is applied, is 3.5 mils thick and has an electric strength of 800–900 volts/mil. After three weeks aging at only 205° C., the electric strength has dropped to 100–150 volts/mil. and the fabric shows very severe cracking, flaking and embrittlement. It is not acceptable for Class H insulation.

*Example 6*

Copolymers of the present invention have the ability to relieve strains on heat aging that is not shown by MPD–I. Following is a comparison of dry films about 1.25 mils thick coated on glass with doctor blades using solutions similar to those of Examples 3 and 4. Such films are freed of solvent by vacuum drying at low temperatures, then heating in a circulating air oven at 150–180° C., followed by removal from the glass for tests:

TABLE I

|  | MPD–I | | MPD–I/T (70/30) | |
| --- | --- | --- | --- | --- |
|  | 22° C. | 150° C. | 22° C. | 150° C. |
| Tensile strength, p.s.i. | 13,500 | 11,200 | 14,600 | 9,850 |
| Percent elongation | 5.15 | 6.30 | 4.05 | 11.8 |
| Modulus of rigidity | 446,000 | 441,000 | 640,000 | 390,000 |

As shown by Table I, the polymers of this invention show a much greater increase in percent elongation and a much greater decrease in modulus of rigidity upon increases in temperature than does the homopolymer MPD–I.

This same comparison exists in films that have been hot drawn 4–5× as shown by the following:

TABLE II

|  | MPD–I | | MPD–I/T (80/30) | |
| --- | --- | --- | --- | --- |
|  | 22° C. | 150° C. | 22° C. | 150° C. |
| Tensile strength, p.s.i. | 22,700 | 18,700 | 25,600 | 4,700 |
| Percent elongation | 7.6 | 5.9 | 8.4 | 28.2 |
| Modulus of rigidity | 644,000 | 426,000 | 810,000 | 160,000 |

*Example 7*

A copolymer solution for coating copper wire is made by dissolving 3.00 g. of MPD–I/T (75/25) in 2.00 g. of dimethyl formamide and 18.00 g. of dimethyl sulfoxide by stirring and heating gently. The solution has an inherent viscosity of 2.04 and a solids content of 13%. Using a wire coating machine, No. 25 copper wire is coated with this solution at a solution temperature of 95–100° C., an oven temperature of 260° C. with a residence time in the oven of 11 minutes. No dies are used in this dip operation. Approximately 1 mil of coating is applied by this operation. The appearance of the coating is smooth and uniform. The dielectric strength of this insulation is 1800 volts/mil and after 6 hours aging at 300° C., it has dropped to 1375 volts/ml. The scrape abrasion is 52, which is excellent compared with 20 for a standard "nylon" wire insulating varnish. The MPD–I/T coated wire is satisfactory for (1) flexibility (i.e., it can be wound around a mandrel of its own diameter without cracking), (2) adhesion (judged by the quick snap test), and (3) heat shock.

*Example 8*

A copolymer solution for coating copper wire is made by dissolving 116 g. of MPD–I/T (70/30) in 198 g. dimethyl sulfoxide, 108 g. dimethyl formamide, 232 g. tetramethylene sulfone and 245 g. mixed xylenes. The viscosity of the solution is Z–7 to Z–8 poises (Gardner-Holdt). A No. 18 copper wire is coated on a commercial wire coating machine using this solution. The coating is done at the rate of 20 ft./min., the oven tower temperature ranges from 515° F. at the bottom to 700° F. at the top. Four passes of the wire through the coating solution and baking oven are made with the time in the oven for baking being 2 minutes and 18 seconds. A film 2.5 mils thick on the wire is obtained. This coated wire is subjected to a number of tests along with similar wire coated with a commercial low temperature wire enamel. The results are shown in Table III. Similar results are obtained with a solution of a similar copolymer containing a 50:50 ratio of isophthaloyl to terephthaloyl radical (MPD–I/T (50:50)).

TABLE III

|  | MPD–I/T Enamel | Commercial Enamel |
| --- | --- | --- |
| Dielectric strength (volts/mil) | 2,750 | 2,500 |
| Wet dielectric strength | 1,550 | 1,000 |
| Scrape abrasion | 99 | 30 |
| Cut-Thru temp.,° C. | 300 | 220 |
| Twist flexibility | 51 | 57 |
| Solvent resistance | OK | OK |
| Solvent crazing | None | None |

FLEXIBILITY

| Mandrel [1] | MPD–I/T at 180° C., Hours Aged | Commercial Enamel at 125° C., Hours Aged |
| --- | --- | --- |
| 3× | 120 | 110 |

[1] Diameter of mandrel that wire can be wound around without cracking of the insulation after the periods of heat aging shown.

Example 9

Several plies of coated glass fabric made as in Example 5 are laminated together by subjecting the stack of plies to 200 lbs./in.² pressure and temperatures of 185°–250° C. for 30 seconds followed by a similar 30 seconds press in a cold or room temperature press. Such laminates are useful as wedges, segment separators and for other purposes in the construction of high temperature electrical equipment.

Example 10

About 8.11 g. (0.075 mole) of m-phenylene diamine and 15.90 g. of sodium carbonate are dissolved in 225 ml. water in a blendor. A solution of 7.68 g. (0.038 mole) of isophthaloyl chloride and 7.68 g. (0.038 mole) terephthaloyl chloride in 270 ml. of tetrahydrofuran is then added with vigorous stirring. After five minutes of mixing, the finely granular product is separated by filtration, washed with water and acetone, and dried. Inherent viscosity in sulfuric acid is 1.54, and yield is 15.6 grams.

Solutions of polymers of this invention are valuable as varnishes, adhesives, wire-coatings, fabric-coatings and similar products. Fabrics suitable as a substrate for the coatings of this invention include woven and non-woven fabrics made from fibers of glass, asbestos, polyethylene terephthalate, polyacrylonitrile, polyhexamethylene adipamide, and other nylons, cotton, wool, polytetrafluoroethylene and mixtures thereof. When applied to wood, metal, and ceramics, these solutions form strong, heat-resistant films which can withstand repeated flexing, hammer blows and chemical attack. For example, a copolymer of this invention was dissolved in dimethylformamide to give a 25% solids solution. A copper sheet was painted with solution and dried at 115° C. The result was a tightly adhering varnish-like coating which withstood flexing of the sheet through 180° C., and even pounding with a hammer while the metal was held at a temperature of 300° C.

All of the copolymers of this invention may be prepared by the procedures disclosed in U.S. Patent No. 3,094,511, dated June 18, 1963.

What is claimed is:
1. A linear high molecular weight polyamide in which at least about 90% of the repeating structural units have the structure

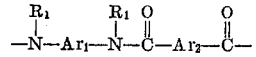

where $R_1$ is selected from the group consisting of hydrogen and lower alkyl, and $Ar_1$ and $Ar_2$ are divalent carbocyclic aromatic radicals having resonance, the intralinear polymer bonds of which are attached directly to non-adjacent carbon atoms in the respective rings of these aromatic radicals, said bonds being positioned in the meta position in 50–80% of the $Ar_2$ radicals and in the para position in the remaining $Ar_2$ radicals, said polyamide having an inherent viscosity of at least 0.6 at 30° C. in concentrated sulfuric acid at a polymer concentration of 0.5% by weight.

2. A polyamide of claim 1 in which $Ar_2$ is a single ring aromatic radical.

3. A polyamide of claim 2 in which $Ar_1$ and $Ar_2$ are each phenylene radicals.

4. A polyamide of claim 3 in which $Ar_1$ is m-phenylene.

5. A film consisting essentially of the polyamide of claim 3.

6. A fiber consisting essentially of the polyamide of claim 3.

References Cited
UNITED STATES PATENTS

| | | | |
|---|---|---|---|
| 2,621,168 | 12/1952 | Ross et al. | 260—78 |
| 2,625,536 | 1/1953 | Kirby | 260—78 |
| 2,742,496 | 4/1956 | Lum et al. | 260—78 |
| 2,756,221 | 7/1956 | Caldwell | 260—78 |
| 2,902,475 | 9/1959 | Burkhard | 260—78 |
| 3,094,511 | 6/1963 | Hill et al. | 260—78 |

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,354,127　　　　　　　　　　　　　　November 21, 1967

Harold Wayne Hill, Jr., et al.

It is certified that error appears in the above identified patent and that said Letters Patent are hereby corrected as shown below:

In the heading to the printed specification, lines 3 and 4, "Stephanie Louis Kwolek" should read -- Stephanie Louise Kwolek --.

Signed and sealed this 12th day of August 1969.

(SEAL)
Attest:

Edward M. Fletcher, Jr.　　　　　　　　　WILLIAM E. SCHUYLER, JR.
Attesting Officer　　　　　　　　　　　　　Commissioner of Patents